United States Patent
Shveidel et al.

(10) Patent No.: US 11,593,266 B2
(45) Date of Patent: Feb. 28, 2023

(54) TECHNIQUES FOR ADAPTIVELY ORGANIZING WRITE PAGES IN CACHE USING HASH TABLES

(71) Applicant: EMC IP Holding Company LLC, Hopkinton, MA (US)

(72) Inventors: Vladimir Shveidel, Pardes-Hana (IL); Geng Han, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 17/386,180

(22) Filed: Jul. 27, 2021

(65) Prior Publication Data

US 2023/0030703 A1 Feb. 2, 2023

(51) Int. Cl.
*G06F 12/0864* (2016.01)

(52) U.S. Cl.
CPC ...... *G06F 12/0864* (2013.01); *G06F 2212/72* (2013.01)

(58) Field of Classification Search
CPC .. G06F 16/2255; G06F 16/172; G06F 3/0643; G06F 3/0644; G06F 12/0866; G06F 12/0868
See application file for complete search history.

(56) References Cited

U.S. PATENT DOCUMENTS

| 8,977,660 | B1 | 3/2015 | Xin et al. | |
| 10,489,058 | B2 | 11/2019 | Zhao et al. | |
| 2004/0083347 | A1* | 4/2004 | Parson | G06F 16/9014 707/E17.036 |
| 2010/0257181 | A1* | 10/2010 | Zhou | G06F 16/2255 711/170 |
| 2011/0283082 | A1* | 11/2011 | McKenney | G06F 12/1018 711/216 |
| 2016/0070714 | A1* | 3/2016 | D'Sa | G06F 16/1748 707/692 |
| 2020/0089816 | A1* | 3/2020 | Shattah | G06F 16/9014 |

OTHER PUBLICATIONS

Shveidel, Vladimir, et al.; "Smooth Flushing of Cached Write Data," U.S. Appl. No. 17/231,197, filed Apr. 15, 2021.

* cited by examiner

*Primary Examiner* — Charles Rones
*Assistant Examiner* — Hewy H Li
(74) *Attorney, Agent, or Firm* — BainwoodHuang (57) ABSTRACT

Techniques performed by a computing device of storing data in a data storage system are provided. A method includes (a) storing references to write commands within entries of a first chained hash table (CHT), the first CHT being pointed to by a first data structure representative of a logical disk; (b) keeping track of a load factor of the first CHT during operation; and (c) in response to determining that the load factor of the first CHT has transitioned outside of predetermined bounds: (1) creating a second CHT and a second data structure representative of the logical disk, the second CHT being pointed to by the second data structure; (2) linking the second data structure to the first data structure via a linked list; and (3) storing references to new write commands directed at the logical disk within entries of the second CHT rather than the first CHT.

20 Claims, 6 Drawing Sheets

TECHNIQUES FOR ADAPTIVELY ORGANIZING WRITE PAGES IN CACHE USING HASH TABLES

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems include a high-speed non-volatile cache into which all writes are persisted upon receipt in order to ensure that the writes are secured against power failure even when the system operates in a write-back mode. Write-back mode allows writes to be acknowledged prior to being completed. These systems acknowledge writes once they are stored in the high-speed non-volatile cache.

SUMMARY

Some storage systems organize cached write commands into a shared working-set structure using hash tables. For example, an outer hash table may include entries for particular logical disks, and each entry may include an inner hash table with entries for address ranges within a particular logical disk. Write commands may then be organized through these address range entries. An example of such an approach is described in U.S. patent application Ser. No. 17/231,197, entitled "SMOOTH FLUSHING OF CACHED WRITE DATA," (Shveidel, et al., hereinafter "Shveidel"), filed on Apr. 15, 2021, the entire content and teaching of which is incorporated herein by this reference.

Unfortunately, using hash tables to represent logical disks as described can lead to inefficiencies under certain conditions. For example, if a large number of write commands happen to come in directed at a single logical disk, then the hash table for that logical disk needs to be able to handle all of those write commands. Since a chained hash table gets slower as its load factor increases, it is desirable to keep the load factor not much larger than 1 (e.g., below 4). However, in order to ensure the load factor is not too large, the number of buckets must be increased. For example, for a cache that is able to store 4 million write commands, if all 4 million write commands are directed at a single logical disk, in order to keep the load factor for that logical disk's hash table below 4, 1 million buckets are needed. If a bucket takes 8 bytes of storage, then 8 megabytes (MB) are needed to just store the buckets for that hash table. However, if instead of all writes being directed to a single logical disk, the writes are distributed across all logical disks of the system, then, if there are for example, 50,000 logical disks, 50,000×8 MB=400 gigabytes (GB) of memory would be needed to store the buckets for 50,000 hash tables, even though the load factor for each hash table is very low, and most storage systems cannot afford to dedicate 400 GB of memory to that purpose. Thus, either a very large amount of memory is wasted storing hash buckets when writes are distributed between many drives, or speed could be reduced when writes are all directed to a small number of drives.

Therefore, it would be desirable to implement these hash tables using dynamic resizing. However, since dynamic resizing typically required expensive rehashing, conventional resizing techniques are also not optimal. Instead, it would be desirable to monitor the load factors of the per-drive hash tables and to split hash tables whose load factors get too large. This splitting may be accomplished by creating multiple hash tables for a single drive, and sending new write commands to a newly-created hash table for that drive, while flushing the existing write commands to persistent storage from the older hash table(s) for that drive. In some embodiments, newly-added hash tables are created with more hash buckets. In some embodiments, underutilized hash tables may also be split to create newly-added hash tables with fewer hash buckets. In some embodiments, hash buckets may be grouped into blocks, and a pool of bucket blocks may be used to conveniently allocate buckets to hash tables.

In one embodiment, a method performed by a computing device of storing data in a data storage system is provided. The method includes (a) storing references to write commands directed at a logical disk within entries of a first chained hash table (CHT) that is associated with the logical disk, the first CHT being pointed to by a first data structure representative of the logical disk; (b) keeping track of a load factor of the first CHT during operation of the data storage system; and (c) in response to determining that the load factor of the first CHT has transitioned outside of predetermined bounds: (1) creating a second CHT that is associated with the logical disk and a second data structure representative of the logical disk, the second CHT being pointed to by the second data structure; (2) linking the second data structure to the first data structure via a linked list; and (3) storing references to new write commands directed at the logical disk within entries of the second CHT rather than the first CHT without moving references to write commands already referenced in the first CHT to the second CHT. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for implementing hash tables using dynamic resizing. In particular, these techniques monitor the load factors of per-drive hash tables and split hash tables whose load factors get too large. This splitting may be accomplished by creating multiple hash tables for a single drive, and sending new write commands to a newly-created hash table for that drive, while flushing the existing write commands to persistent storage from the older hash table(s) for that drive. In some embodiments, newly-added hash tables are created with more hash buckets. In some embodiments, underutilized hash tables may also be split to create newly-added hash tables with fewer hash buckets. In some embodiments, hash buckets may be grouped into blocks, and a pool of bucket blocks may be used to conveniently allocate buckets to hash tables.

Figure 1:
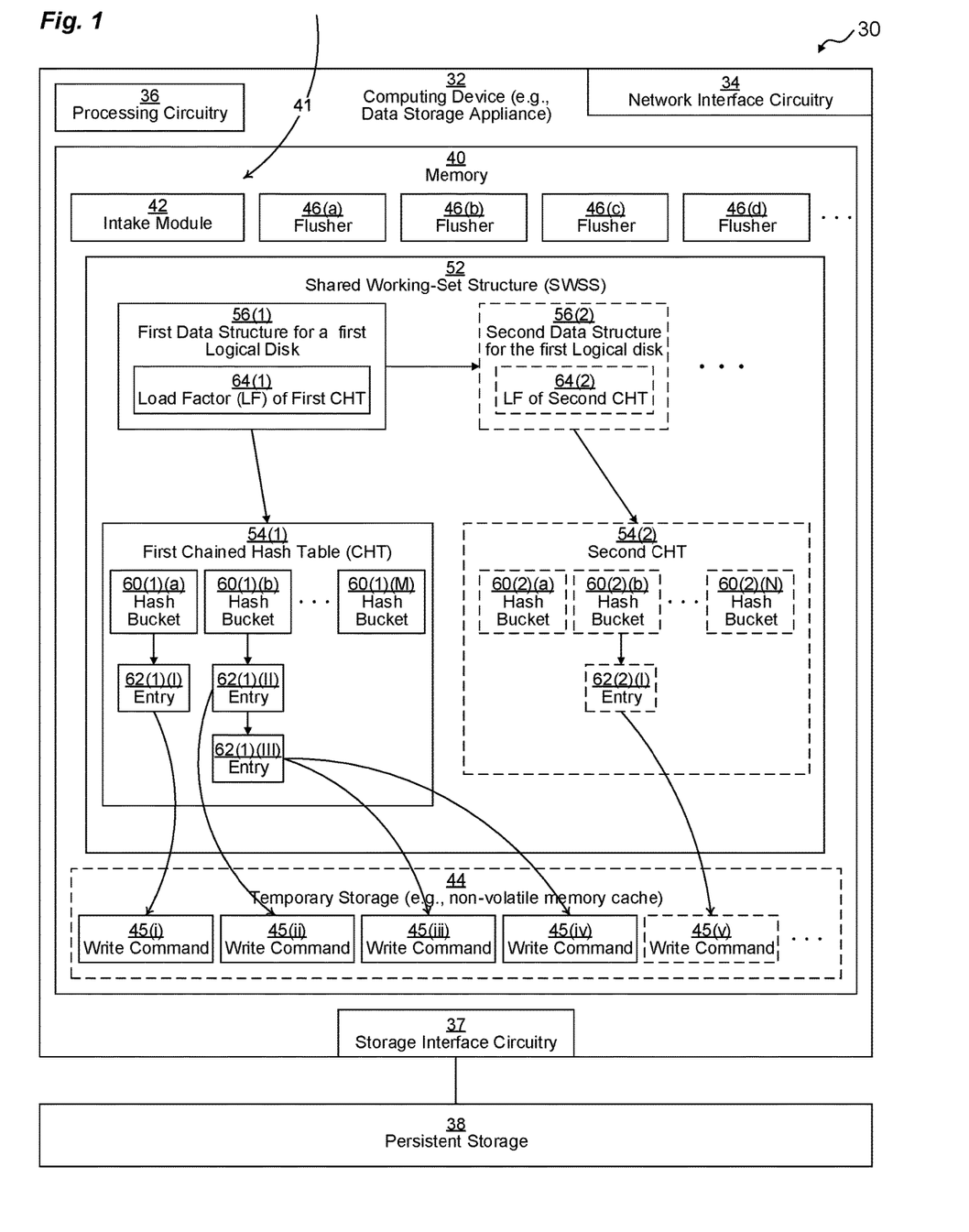
FIG. 1 is a block diagram depicting an example system, apparatus, and data structure arrangement for use in connection with various embodiments.

FIG. 1 depicts an example environment 30 for use in connection with various embodiments. Environment 30 includes a computing device 32. Computing device 32 may be any kind of computing device, such as, for example, a personal computer, workstation, server computer, enterprise server, data storage array device, laptop computer, tablet computer, smart phone, mobile computer, etc. In an example embodiment, computing device 32 may be a data storage appliance configured to provide access to persistent storage 38.

Computing device 32 may include network interface circuitry 34, processing circuitry 36, storage interface circuitry 37, and memory 40.

Processing circuitry 36 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above.

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage drives (not depicted), such as, for example, hard disk drives, solid-state storage devices (SSDs), flash drives, etc.

Network interface circuitry 34 may include one or more Ethernet cards, cellular modems, Fibre Channel (FC) adapters, InfiniBand adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc.

Memory 40 may include any kind of digital system memory, such as, for example, random access memory (RAM). Memory 40 stores an operating system (OS) (not depicted) and various drivers (e.g., storage drivers, not depicted) in operation (e.g., a Linux, UNIX, Windows, MacOS, or similar operating system). Memory 40 also stores an intake module 42, a plurality of flushers 46 (depicted as flushers 46(a), 46(b), 46(c), 46(d), . . . ), and other software modules (not depicted) which each execute on processing circuitry 36. Memory 40 also stores a shared working-set structure (SWSS) 52.

In some embodiments, memory 40 includes a temporary storage portion 44 of non-volatile memory, such as, for example, a high-speed cache. Non-volatile memory portion 44 may include, for example, Intel Optane memory, a high-speed SSD drive, etc. In some embodiments, non-volatile memory portion 44 may be shared or mirrored with another computing device 32.

Memory 40, typically within non-volatile memory portion 44, includes cached write commands 45 (depicted as write commands 45(i), 45(ii), 45(iii), 45(iv), . . . ), which, as time progresses, are flushed to persistent storage 38 by flushers 46. In an example embodiment, write commands 45 may be stored within non-volatile memory portion 44 as paired page buffers and page descriptors, as described in Shveidel in connection with FIG. 1 of that Application.

SWSS 52 is a structure that organizes the write commands 45 for efficient flushing by flushers 46. In some embodiments, SWSS 52 may be structured as described in Shveidel.

SWSS 52 includes a set of at least one data structure 56 and at least one chained hash table (CHT) 54 for organizing write commands 45 directed at a particular logical disk (not depicted). Thus, as depicted, first CHT 54(1) includes entries 62 that reference write commands 45 directed at one logical disk, and first data structure 56(1) is associated with and points to first CHT 54(1). As depicted, first CHT 54(1) includes a plurality of hash buckets 60 (depicted as hash buckets 60(1)(a)-60(1)(M)), and entries 62 are chained off of one or more of those hash buckets 60. In some embodiments, each hash bucket 60 may include space (e.g., 4-6 bytes) for a pointer (not depicted) to a first entry 62 in a chain as well as space (e.g., 1-2 bytes) for a spinlock. As depicted, entry 62(1)(I) references write command 45(i); entry 62(1)(II) references write commands 45(ii), 45(iii); and entry 62(1)(III) references write command 45(iv). The structure of an entry 62 may be as described in connection with FIG. 4 of Shveidel, for example. The structure and operation of first CHT 54(1) may be as described in connection with FIGS. 3A-3C of Shveidel, for example.

The load factor (LF) 64 of each CHT 54 may be monitored and stored in connection with its associated data structure 56.

In operation, intake module 42 initially processes incoming write commands 41 (and other commands that make changes, such as delete and unmap commands), creating cached write commands 45 and referencing those cached write commands 45 through appropriate entries 62 of CHTs 54 within the SWSS 52. In addition, several flushers 46 operate concurrently. Each flusher 46 is responsible for a particular fixed-length storage segment (not depicted) in persistent storage 38. Each flusher 46 operates independently, persisting the data of write commands 45 into its fixed-length storage segment. See Shveidel for a description of example operation of intake module 42 and flushers 46.

As intake module 42 processes incoming write commands 41 and adds references to cached write commands 45 into CHTs 54, it may need to add new entries 62 into CHTs 54. In some embodiments, each entry 62 is associated with a particular logical address range within the logical disk associated with its CHT 54. Thus, for example, an entry 62 may represent an address range of 512 or 1024 consecutive logical block addresses. Thus, cached write commands 45 directed at addresses within that range are referenced by that entry 62. If a particular write command 45 is directed towards an address that is not yet represented by any entry 62, then intake module 42 adds a new entry 62 for the appropriate address range to the CHT 54, placing it at an appropriate location within the CHT 54 based on a hash of an identifier of its address range.

As intake module 42 adds entries 62 to first CHT 54(1), it updates the LF 64(1) of that CHT 54(1). Once the LF 64(1) increases above a threshold, a split operation is performed. In the split operation, second CHT 54(2) and second data structure 56(2) are created to also represent the same logical disk as first CHT 54(1) and first data structure 56(1). Second CHT 54(2) and second data structure 56(2) have a similar structure as do first CHT 54(1) and first data structure 56(1). After the split, as intake module 42 receives new write commands 41 directed at the logical volume, it instead inserts references to the cached write commands 45 that are newly added into second CHT 54(2) instead of inserting references into first CHT 54(1). This arrangement allows more cached write commands 45 to be stored for a particular logical disk without the LF 64 of its CHT 54 increasing too high, which would negatively impact performance. In some embodiments, upon a split, the second CHT 54(2) is created with a different number, N, of hash buckets 60(2), instead of the M hash buckets 60(1) of first CHT 54(1). In some cases, N>M. It is also possible for M to be greater than N— in such cases, second CHT 54(2) may be created in response to LF 64(1) being too low for too long.

Memory 40 may also store various other data structures used by the OS, modules 42, 46, and various other applications and drivers. In some embodiments, memory 40 may also include a persistent storage portion. Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the computing device 32 is powered off. The OS, modules 42, 46, and various other applications and drivers are typically stored in this persistent storage portion of memory 40 or on persistent storage 38 so that they may be loaded into a system portion of memory 40 upon a system restart or as needed. The OS, modules 42, 46, and various other applications and drivers, when stored in non-transitory form either in the volatile portion of memory 40, or on persistent storage 38 or in persistent portion of memory 40, each form a computer program product. The processing circuitry 36 running one or more applications thus forms a specialized circuit constructed and arranged to carry out the various processes described herein.

Figure 2:
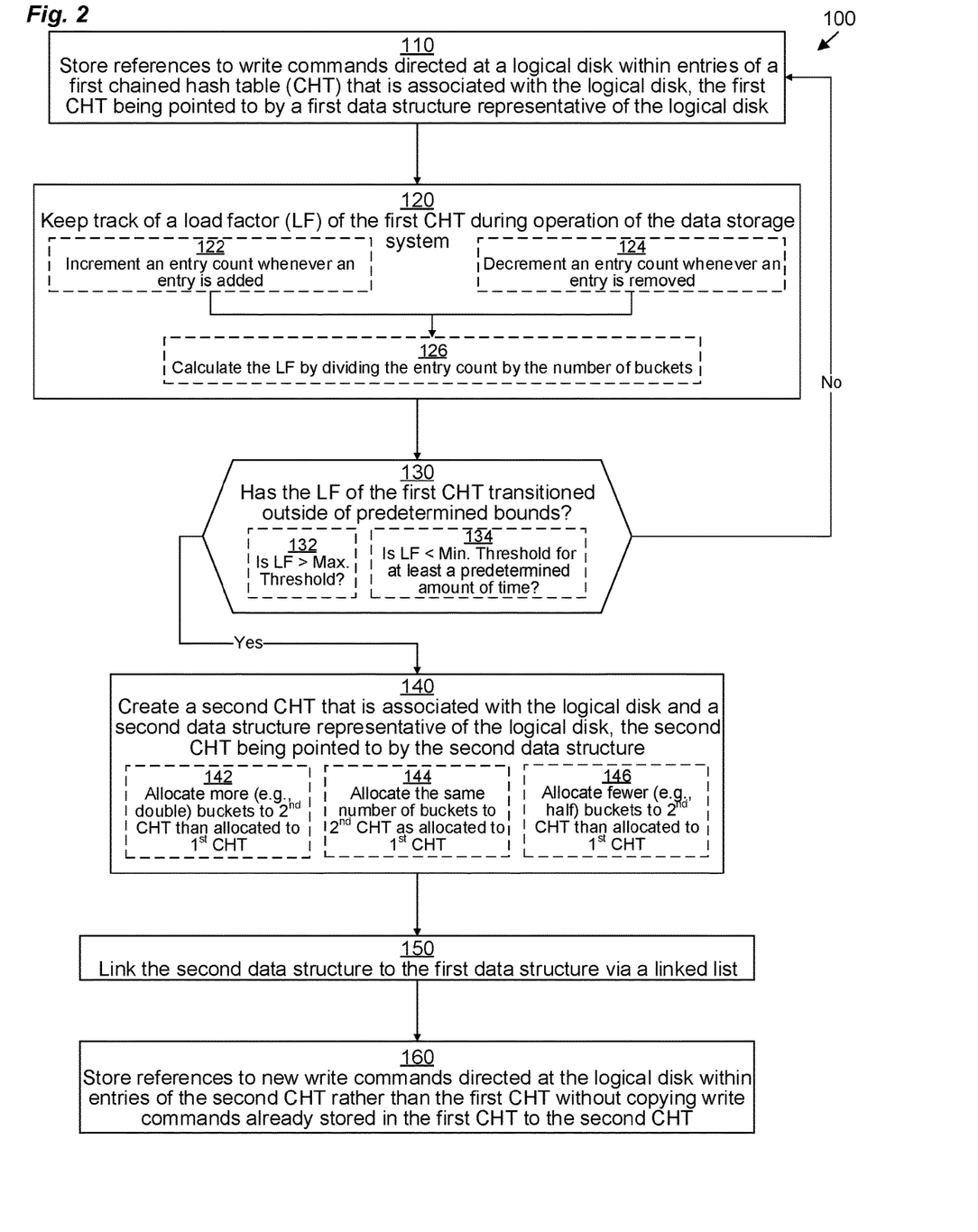
FIG. 2 is a flowchart depicting an example procedure according to various embodiments.

FIG. 2 illustrates an example method 100 performed by computing device 32 acting as a data storage system. It should be understood that any time a piece of software (e.g., OS, modules 42, 46, etc.) is described as performing a method, process, step, or function, what is meant is that a computing device (e.g., computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, intake module 42 stores references to write commands 45 directed at a logical disk within entries 62(1) of a first CHT 54(1) that is associated with the logical disk, the first CHT 54(1) being pointed to by a first data structure 56(1) representative of the logical disk.

In step 120, intake module 42 and/or flusher 46 keeps track of the LF 64(1) of the first CHT 54(1) during operation of the data storage system. In some embodiments, step 120 may include sub-steps 122, 124, 126. In sub-step 122, whenever an entry 62 is added to first CHT 54(1), intake module 42 increments an entry count 232 (see FIG. 3) for first CHT 54(1). See below in connection with FIG. 4 for more details. In sub-step 124, whenever an entry 62 is removed from first CHT 54(1), a flusher 46 decrements the entry count 232 for first CHT 54(1). See below in connection with FIG. 5 for more details. Then, in sub-step 126, computing device 32 calculates the LF 64(1) of the first CHT 54(1) by dividing the entry count 232 by the total number, M, of buckets 60(1) in the first CHT 54(1).

In step 130, computing device 32 determines whether the LF 64(1) of the first CHT 54(1) has transitioned outside of predetermined bounds. If not, normal operation resumes at step 110. Otherwise, operation continues with step 140.

In some embodiments, step 130 may include sub-step 132 and/or sub-step 134. In sub-step 132, intake module 42 determines whether the LF 64(1) exceeds a maximum LF threshold value 240 (see FIG. 3). If so, step 130 also has an affirmative result. In one embodiment, maximum LF threshold value 240 is 4. In other embodiments, maximum LF threshold value 240 may take another value within a range of 1-4, or possibly as high as 16. In sub-step 134, a flusher 46 determines whether the LF 64(1) is less than a minimum LF threshold value 242 (see FIG. 3) and has been so for at least a threshold time 243 (see FIG. 3). If so, step 130 also has an affirmative result. In one embodiment, minimum LF threshold value 242 is 1. In other embodiments, maximum LF threshold value 240 may take another value within a range of 0.1-1.25. In one embodiment, threshold time 243 is 250 milliseconds (ms). In other embodiments, threshold time 243 may take another value within a range of 100 ms to 10 seconds.

In step 140, computing device 32 creates a second CHT 54(2) that is also associated with the same logical disk as CHT 54(1) and a second data structure 56(2) representative of the same logical disk, the second CHT 54(2) being pointed to by the second data structure 56(2). Step 140 may include one or more of sub-steps 142, 144, 146, depending on the embodiment and scenario.

In a scenario in which sub-step 132 has been activated, then, step 140 includes sub-step 142 and/or sub-step 144. In sub-step 142, intake module 42 allocates more, N, buckets 60(2) to second CHT 54(2) than the number, M, of buckets 60(1) allocated to first CHT 54(1). In one embodiment, N is double M. In sub-step 144, intake module 42 allocates the same number, N, buckets 60(2) to second CHT 54(2) as the number, M, of buckets 60(1) allocated to first CHT 54(1), so N=M.

In a scenario in which sub-step 134 has been activated, then, step 140 includes sub-step 144 and/or sub-step 146. In sub-step 146, a flusher 46 allocates fewer, N, buckets 60(2) to second CHT 54(2) than the number, M, of buckets 60(1) allocated to first CHT 54(1). In one embodiment, N is half of M.

Then, in step 150, computing device 150 links the second data structure 56(2) to the first data structure 56(1) via a linked list.

Then, in step 160, intake module 42 stores references to new write commands 45 directed at the logical disk within entries 62(2) of the second CHT 54(2) rather than the first CHT 54(1) without moving references to write commands 45 already referenced in the first CHT 54(1) to the second CHT 54(2). Thus, as depicted in FIG. 1, write commands 45(i)-45(iv), which are already referenced by entries 62(1) of the first CHT 54(1) remain referenced by entries 62(1) of the first CHT 54(1), and they do not become referenced by entries 62(2) of the second CHT 54(2), but a newly-store write command 45(*v*) is referenced by new entry 62(2)(I) of the second CHT 54(2).

Figure 3:
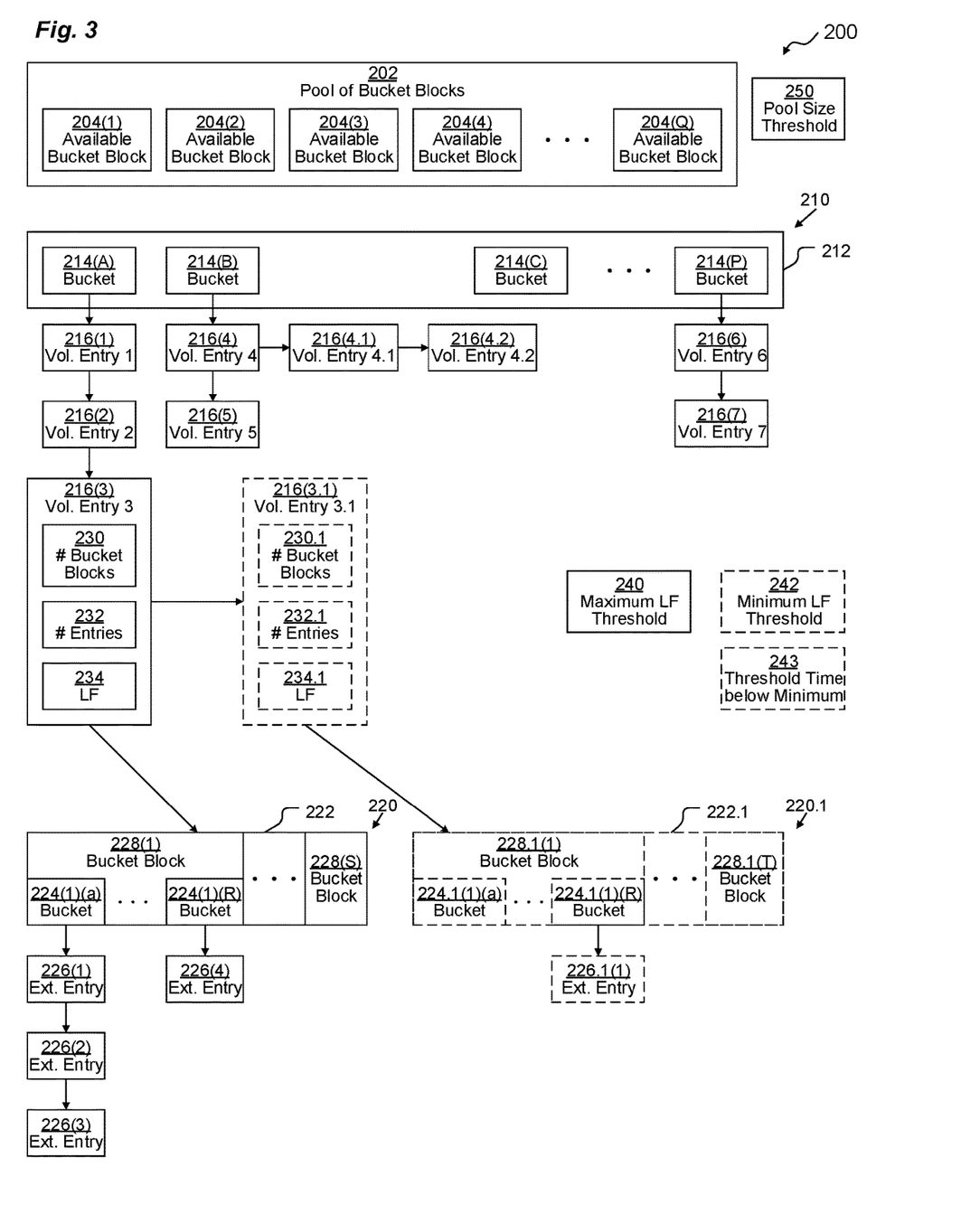
FIG. 3 is a block diagram depicting an example data structure arrangement for use in connection with various embodiments.

FIG. 3 illustrates an example arrangement 200 of SWSS 52, including a pool 202 of bucket blocks 204, an outer CHT 210, a set of inner CHTs 220, 220.1, and various predetermined values 240, 250, and optionally 242, 243.

Pool 202 includes a set of available bucket blocks 204 (depicted as available bucket blocks 204(1)-204(Q)), which may be removed from the pool 202 and allocated to inner CHTs 54 (depicted as inner CHTs 220, 220.1) as allocated buckets 228. A bucket block 204, 228 is a data block having a size the same as that of other storage blocks of data storage system (e.g., 4 or 8 kilobytes (KB)). Each bucket block 204, 228 includes a fixed number, R, of buckets 224. For example, if the block size is 8 KB and each bucket 224 takes up 8 bytes, then the number, R, of buckets 224 per bucket block 204 is 1024. There are a predetermined total number of bucket blocks 204, 228 within SWSS 52, such as, for example, 32 million or 64 million. Pool size threshold 250 represents the minimum number of available bucket blocks 204 below which special measures are taken. Thus, if the number, Q, of available bucket blocks 204 drops below, the pool size threshold 250, then steps may be taken to reclaim allocated buckets 228 back to the pool 202. In one embodiment, the pool size threshold 250 may be 8 million. In another embodiment, the pool size threshold 250 may be set to a value experimentally determined for the computing device 32 to allow for the write commands 41 to continue to be ingested for at least 1 second without running out of buckets 224.

Outer CHT 210 includes a set 212 of buckets 214 (depicted as buckets 214(A)-202(P)). One or more buckets 214 points to a chain of volume entries 216. As depicted, bucket 214(A) points to volume entries 216(1), 216(2), 216(3), bucket 214(B) points to volume entries 216(4.0), 216(5), and bucket 214(P) points to volume entries 216(6), 216(7), while bucket 214(C) is empty. See Shveidel in connection with FIGS. 6A-6C for more details on an example configuration of outer CHT 210 and in connection with FIG. 7 for more details on an example configuration of volume entries 216.

Some volume entries 216 may be arranged in linked lists. Volume entries 216 that appear directly in chains from buckets 214 are eligible to be flushed by flushers 46, while volume entries 216 that do not directly in chains from buckets 214 are not yet eligible to be flushed by flushers 46. These volume entries 216 may also be identified by identifiers ending in "0.1" or "0.2," etc.

Taking volume entry 216(3) as a representative example, a volume entry 216 points to an inner CHT 54. Thus, as depicted, volume entry 216(3) points to inner CHT 220. Inner CHT 220 includes a set 222 of bucket blocks 228 (depicted as bucket blocks 228(1)-228(S)) that include hash buckets 224. One or more buckets 224 points to a chain of extent entries 226. As depicted, bucket 224(1)(*a*) points to extent entries 226(1), 226(2), 226(3) and bucket 224(1)(R) points to extent entry 226(4). See Shveidel in connection with FIGS. 3A-3C for more details on an example configuration of inner CHTs 54 and in connection with FIG. 4 for more details on an example configuration of extent entries 226.

Volume entry 216(3) also stores a number 230 of bucket blocks 228 allocated to CHT 220, i.e., S; an entry count 232 of extent entries 226 present in CHT 220; and the current LF 234 of CHT 220.

When LF 234 transitions outside of its predetermined bounds, then computing device 32 may perform a split operation, creating a new volume entry 216(3.1), linked to volume entry 216(3) in a linked list, as depicted. This new volume entry 216(3.1) has a similar structure to volume entry 216(3), and it points to a new inner CHT 220.1. New inner CHT 220.1 has a similar structure to inner CHT 220, but it may have a different number, T, of bucket blocks 228.1. New inner CHT 220.1 is used to reference newly stored write commands 45 (e.g., write command 45(*v*)) in place of inner CHT 220, but flushing is performed first on extent entries 226 of inner CHT 220.

LF 234 may be deemed to be outside of its predetermined bounds when, for example, LF 234 exceeds the maximum LF threshold 240. As another example, in some embodiments, LF 234 may be deemed to be outside of its predetermined bounds when LF 234 is less than the minimum LF threshold 242 for at least the threshold time 243.

Figure 4:
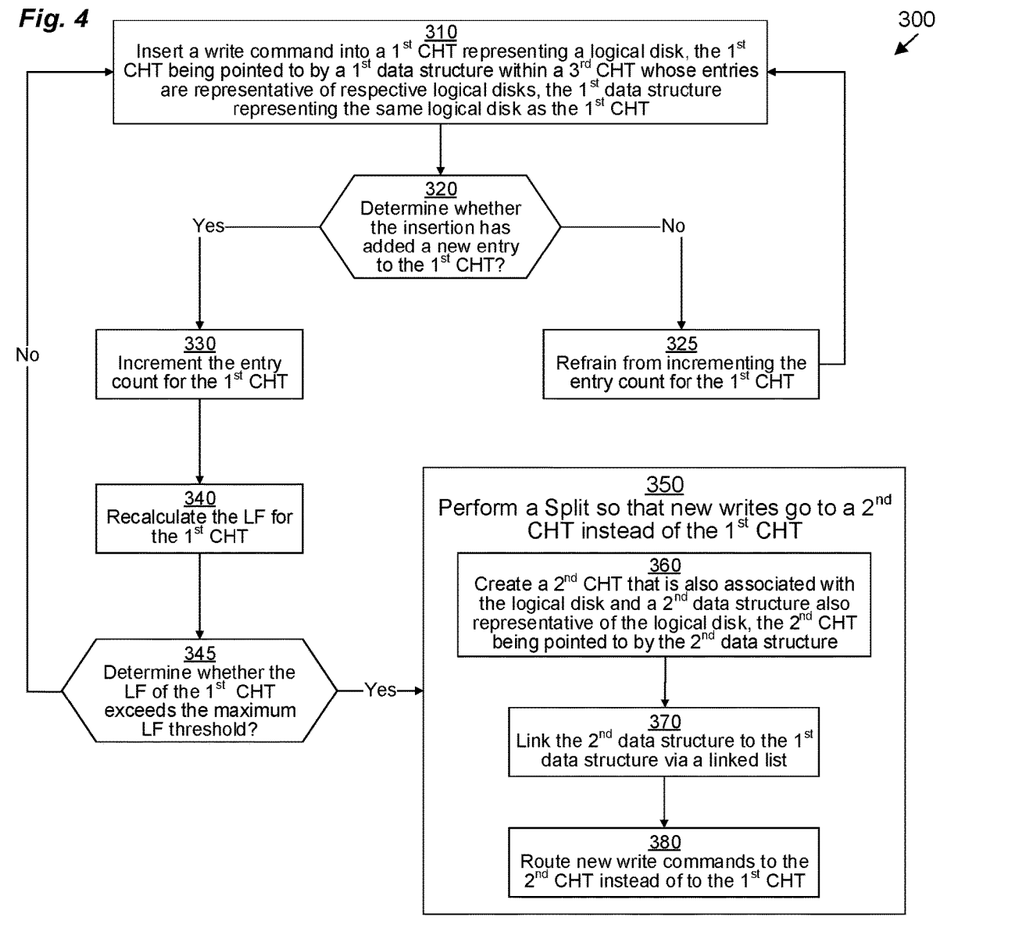
FIG. 4 is a flowchart depicting an example procedure according to various embodiments.

FIG. 4 depicts an example method 300 performed by intake module 42 for updating entry count 232 and LF 234 upon inserting a write command 45 into an inner CHT 54 and deciding whether to perform a split operation In step 310, intake module 42 inserts a reference to a write command 45 into a first CHT 54(1), 220 representing a logical disk, the first CHT 54(1), 220 being pointed to by a first data structure 56(1), 216(3) within a third CHT 210 whose entries 216 are representative of respective logical disks, the first data structure 56(1), 216(3) representing the same logical disk as the first CHT 54(1), 220. It should be understood that step 310 may take place immediately after an incoming write command 41 is stored within temporary storage 44 as write command 45.

It should be understood that intake module 42 inserts the reference into the CHT 54 of the rightmost volume entry 216 linked in a linked list. Thus, as depicted in FIG. 3, since volume entry 216(3) is initially the only volume entry 216 in the linked list (since volume entry 216(3.1) has not yet been created), method 300 is performed on volume entry 216(3) and CHT 220. However, were method 300 instead performed on the logical disk associated with volume entries 216(4), 216(4.1), 216(4.2), it would instead be performed on volume entry 216(4.2) and the CHT (not depicted) to which volume entry 216(4.2) points.

Then, in step 320, intake module 42 determines whether the insertion from step 310 has added a new entry 62(1), 226 to the first CHT 54(1), 220. If not (i.e., if the write command 45 is situated at a logical address already represented by an existing entry 62(1), 226 in the first CHT 54(1), 220), then operation proceeds as normal, potentially returning back to step 310 for processing of another write command 41, 45. If step 320 has an affirmative result, then operation proceeds with step 330.

In step 330, intake module 42 increments the entry count 232 for the first CHT 54(1), 220. Then, in step 340, intake module 42 recalculates and updates the LF 64(1), 234 for the first CHT 54(1), 220 by dividing the entry count 232 by the total number, M, of buckets 60(1), 224 in the first CHT 54(1), 220. It should be understood that the total number, M, of buckets 60(1), 224 may be obtained by multiplying the number 230 of bucket blocks 228 in the first CHT 54(1), 220 by the number (e.g., 1024) of buckets 224 per bucket block 204, 228.

Then, in step 345, intake module 42 determines whether the now-updated LF 64(1), 234 of the first CHT 54(1), 220 exceeds the maximum LF threshold 240. If not, then operation proceeds as normal, potentially returning back to step 310 for processing of another write command 41, 45. If step 345 has an affirmative result, then operation proceeds with step 350.

Figure 5:
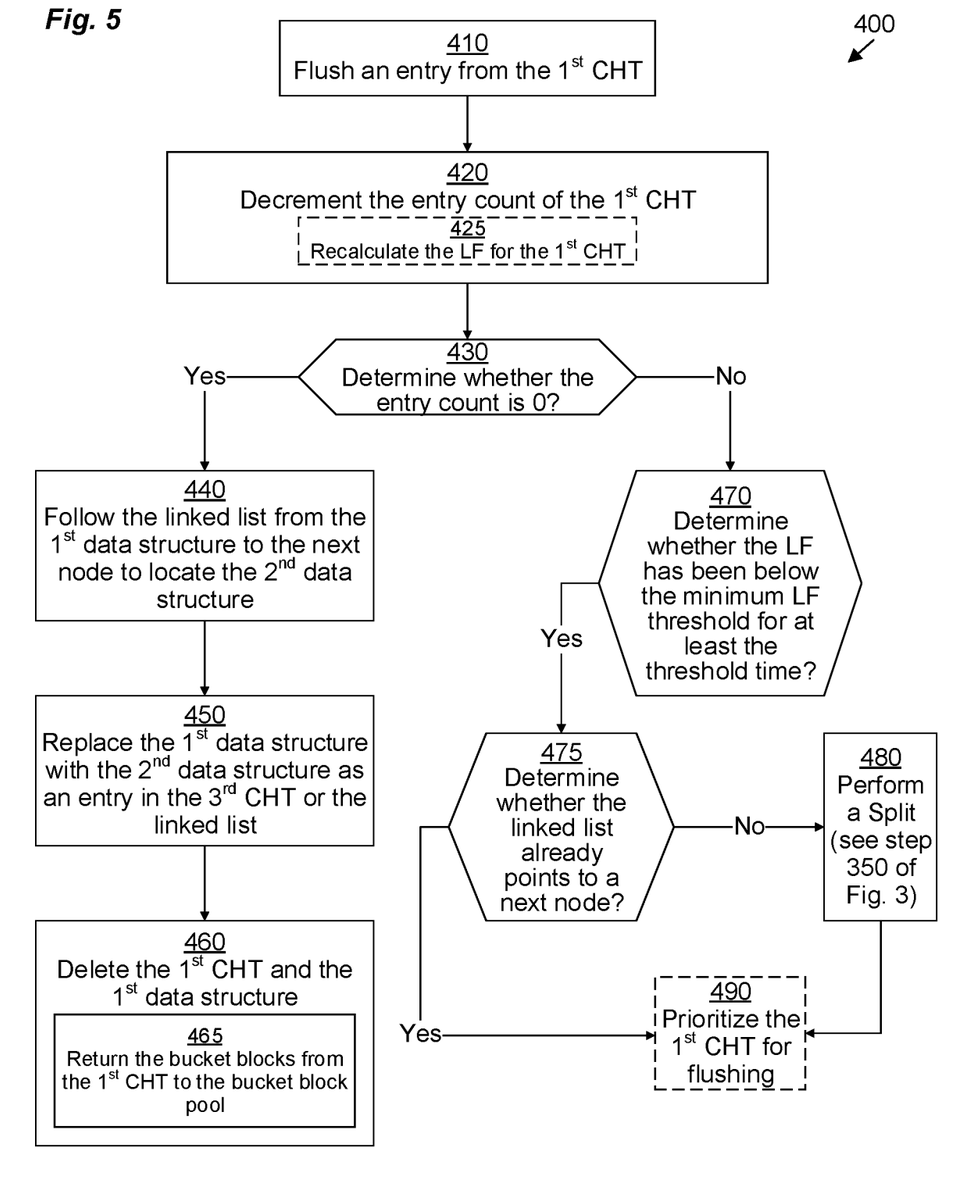
FIG. 5 is a flowchart depicting an example procedure according to various embodiments.
Figure 6:
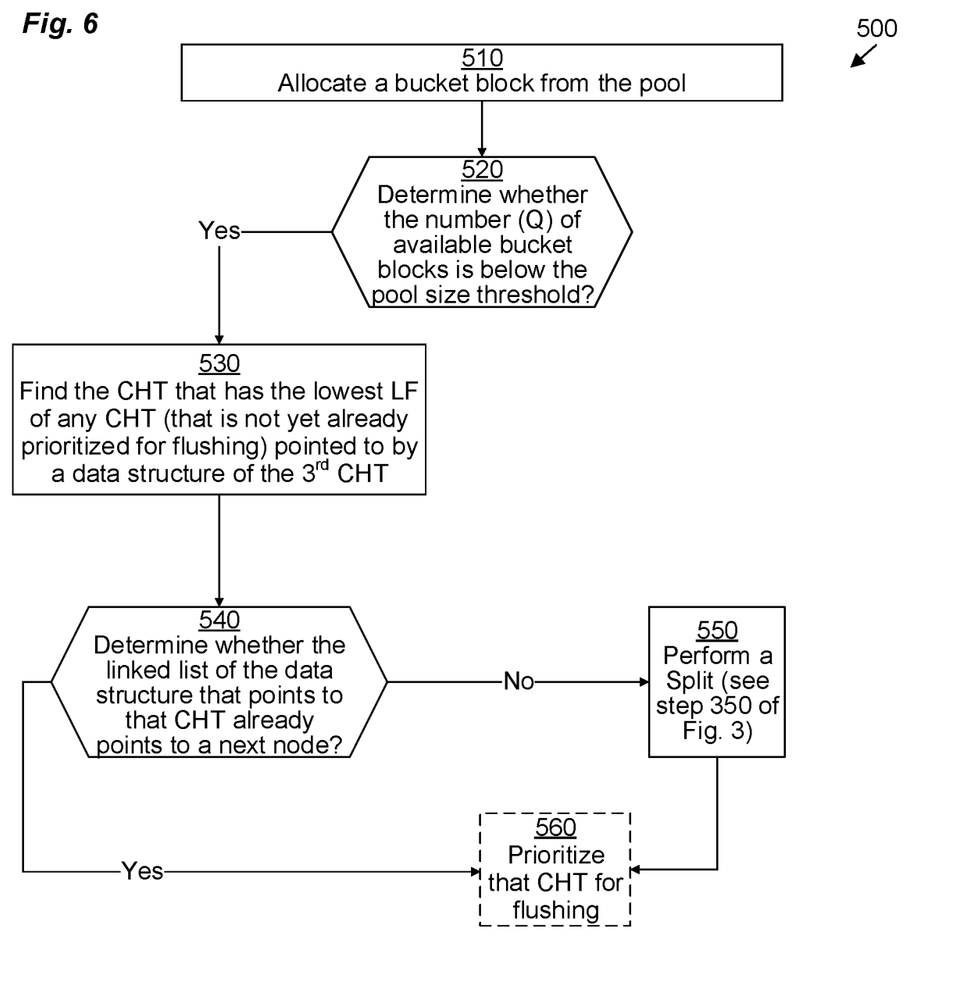
FIG. 6 is a flowchart depicting an example procedure according to various embodiments.

Step 350, although depicted as part of method 300 in FIG. 4, can also be performed in the context of FIGS. 5 (see step 480) and 6 (see step 550). In the context of method 300, step 350 may either be performed by intake module 42 or by separate software module (not depicted) that is called by intake module 42. For simplicity, step 350 will be described below as being performed by intake module 42.

In step 350, intake module 42 performs a split operation so that new writes 41 aimed at the particular logical disk with which first CHT 54(1), 220 is associated instead go to second CHT 54(2), 220.1. Step 350 may includes sub-steps 360, 370, 380.

In sub-step 360, intake module 42 creates the second CHT 54(2), 220.1 and second data structure 56(2), 216(3.1) to also be associated with the same particular logical disk. Second data structure 56(2), 216(3.1) is created to point to second CHT 54(2), 220.1, as depicted in FIGS. 1 and 3.

Then, in step 370, intake module 42 links the second data structure 56(2), 216(3.1) to the first data structure 56(1), 216(3) via a linked list, as illustrated in FIGS. 1 and 3. See Shveidel in connection with FIG. 6C for more details on an example configuration this linked list and in connection with FIG. 7 for more details on an example configuration of volume entries 216 including the version pointers 604, 606 that may be used for the linked list.

Then, in step 380, intake module 42 routes new write commands 41 aimed at the particular logical disk to the second CHT 54(2), 220.1 via second data structure 56(2), 216(3.1), instead of to the first CHT 54(1), 220 via first data structure 56(1), 216(3).

FIG. 5 depicts an example method 400 performed by a flusher 46 for updating entry count 232 and LF 234 upon flushing an extent entry 62, 226 from an inner CHT 54 and deciding whether to perform a split operation.

In some embodiments, as described in Shveidel, flushers 46 iterate through extent entries 226, flushing their contents to persistent storage 38.

In step 410, a flusher 46 flushes an entry 226 from a CHT 54(X) (e.g., first CHT 220 in the example arrangement 200 of FIG. 3). It should be understood that flusher 46 flushes entries from the CHT 54 of a leftmost volume entry 216 linked in a linked list. Thus, as depicted in FIG. 3, since volume entry 216(3) is initially the only volume entry 216 in the linked list (since volume entry 216(3.1) has not yet been created), method 300 is performed on volume entry 216(3) and CHT 220. However, were method 300 instead performed on the logical disk associated with volume entries 216(4), 216(4.1), 216(4.2), it would instead be performed on volume entry 216(4) and the CHT (not depicted) to which volume entry 216(4) points.

Then, in step 420, flusher 46 decrements the entry count 232 for that CHT 54(X), 220. Step 420 may include sub-step 430 (although, in some embodiments, sub-step 430 may instead be performed later, as part of step 470), in which flusher 46 recalculates and updates the LF 64(X), 234 for the CHT 54(X), 220 by dividing the entry count 232 by the total number, M, of buckets 60(X), 224 in the CHT 54(X), 220. It should be understood that the total number, M, of buckets 60(X), 224 may be obtained by multiplying the number 230 of bucket blocks 228 in the CHT 54(X), 220 by the number (e.g., 1024) of buckets 224 per bucket block 204, 228.

Then, in step 430, flusher 46 determines whether the now-updated entry count 232 (or, in some embodiments, LF 64(X), 234) of the CHT 54(X), 220 equals zero. If so, then the CHT 54(X), 220 and its associated data structure 56(X), 216(3) may be removed in steps 440-460. Otherwise, operation may proceed with steps 470-490.

In step 440, flusher 46 follows the linked list from the associated data structure 56(X), 216(3) to locate the linked data structure 56(X+1), 216(3.1). Then, in step 450, flusher 46 replaces the associated data structure 56(X), 216(3) within outer CHT 210 with linked data structure 56(X+1), 216(3.1). Thus, in the example of FIG. 3, volume entry 216(3.1) would be pointed to by volume entry 216(2) along the chain from bucket 214(A) in place of volume entry 216(3). If there is no linked data structure 56(X+1), 216 (3.1), then, the associated data structure 56(X), 216(3) is removed from the chain in step 450.

In step 460, flusher 46 deletes CHT 54(X), 220 and its associated data structure 56(X), 216(3). Step 460 may include sub-step 465, in which flusher 46 returns the bucket blocks 228 (e.g., bucket blocks 228(1) . . . 228(S)) from CHT 54(X), 220 to the pool 202 as available bucket blocks 204. Method 400 terminates after step 460.

In step 470, flusher 46 determines whether the LF 64(X), 234 of the CHT 54(X) has been below the minimum LF threshold 242 for at least the threshold time 243. If not, then method 400 terminates. Otherwise, operation proceeds with step 475.

In step 475, flusher 46 determines whether the linked list from the associated data structure 56(X) already points to a linked data structure 56(X+1) or not. In the example in which the data structure 56(X) is volume entry 216(3) and volume entry 216(3.1) already exists and is pointed to by volume entry 216(3), then step 475 has an affirmative result. In an example in which the data structure 56(X) is volume entry 216(3) and volume entry 216(3.1) does not yet exist, then step 475 has a negative result. If step 475 has a negative result, operation proceeds with step 480. In step 480, flusher 46 (or a separate software module, not depicted) performs a split operation, similar to step 350 from method 300.

In some embodiments, after step 480 and after an affirmative result from step 475, operation may proceed with optional step 490. In other embodiments, method 400 terminates. In step 490, flusher 46 prioritizes the CHT 54(X), 220 for flushing. Thus, going forward, flushers 46 will preferentially flush (using method 400) entries 62(1), 226 from CHT 54(X), 220. Multiple CHTs 54 may be prioritized for flushing at once. In such a case, there may be an order of priority (e.g., CHTs 54 that were prioritized first may have higher priority). Method 400 terminates after step 490.

FIG. 6 depicts an example method 500 performed by computing device 32 for when an available bucket block 204 is allocated (step 510) from the pool 202. Method 500 may be performed as part of step 140 (FIG. 2), or as part of step 350 (FIG. 4; also referenced by FIGS. 5 and 6). Method 500 may be used to determine when to perform a split operation in order to allow an underutilized inner CHT 54 to be flushed, allowing its bucket blocks 228 to be returned to the pool 202. Method 500 may be performed by intake module 42, a flusher 46, or another software module (not depicted). For simplicity, method 500 will be described below as being performed by intake module 42.

In step 510, intake module 42 allocates bucket block 204 from the pool 202 to be placed into a new CHT 54 (e.g., into CHT 220.1 as a bucket block 228.1). Then, in step 520, intake module 42 determines whether the number, Q, of available bucket blocks 204 in the pool 202 is below the pool size threshold 250. If not, then method 500 terminates. Otherwise, operation proceeds with step 530.

In step 530, intake module 42 searches to find the CHT 54(Y) that has the lowest LF 64, 234, excluding CHTs 54 that are already prioritized for flushing (see step 490 from FIG. 5 as well as step 560 below). This may be accomplished by traversing the outer CHT 210, and comparing the LF 234 recorded in each traversed volume entry 216 (excluding the LFs 234 from CHTs 54 that are already prioritized for flushing).

Then, in step 540, intake module 42 determines whether the linked list from the associated data structure 56(Y) already points to a linked data structure 56(Y+1) or not. If step 540 has a negative result, operation proceeds with step 550. In step 550, intake module 42 performs a split operation, similar to step 350 from method 300.

In some embodiments, after step 550 and after an affirmative result from step 540, operation may proceed with optional step 560. In other embodiments, method 500 terminates. In step 560, intake module 42 prioritizes the CHT 54(Y) for flushing. Thus, going forward, flushers 46 will preferentially flush (using method 400) entries 62, 226 from CHT 54(Y). Multiple CHTs 54 may be prioritized for flushing at once. In such a case, there may be an order of priority (e.g., CHTs 54 that were prioritized first may have higher priority). Method 500 terminates after step 560.

Thus, techniques for implementing hash tables 54, 220 using dynamic resizing have been described. In particular, these techniques monitor the load factors 64, 234 of per-drive hash tables 54, 220 and split (step 350) hash tables 54, 220 whose load factors 64, 234 get too large. This splitting may be accomplished by creating multiple hash tables (e.g., CHTs 220, 220.1) for a single drive, and sending new write commands 41 to a newly-created hash table 220.1 for that drive, while flushing the existing write commands 45 to persistent storage 38 from the older hash table(s) 220 for that drive. In some embodiments, newly-added hash tables 220.1 are created with more hash buckets 60, 224. In some embodiments, underutilized hash tables 54, 220 may also be split to create newly-added hash tables 220.1 with fewer hash buckets 60, 224. In some embodiments, hash buckets 60, 224 may be grouped into blocks 204, 228, and a pool 202 of bucket blocks 204 may be used to conveniently allocate buckets 60, 224 to hash tables 54, 220.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

The word "each," when used in conjunction with members of a "set," means that each and every member of the set has a particular feature, but there may be additional similar items that are not members of the set and do not have the particular feature. Thus, for example, the statement that "each of a set of devices is blue" means that for a particular set of devices, each of those devices is blue, but it does not mean to exclude the possibility that there are additional devices not in the set that are not blue.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method performed by a computing device of storing data in a data storage system, the method comprising:
storing references to write commands directed at a logical disk within entries of a first chained hash table (CHT) that is associated with the logical disk, the first CHT being pointed to by a first data structure representative of the logical disk;
keeping track of a load factor of the first CHT during operation of the data storage system;
determining that the load factor of the first CHT has transitioned outside of predetermined bounds; and
in response to the determination:
creating a second CHT that is associated with the logical disk and a second data structure representative of the logical disk, the second CHT being pointed to by the second data structure;
linking the second data structure to the first data structure via a linked list; and
storing references to new write commands directed at the logical disk within entries of the second CHT rather than the first CHT without moving references to write commands already referenced in the first CHT to the second CHT.

2. The method of claim 1 wherein the first data structure is an entry of a third CHT that represents a set of logical disks managed by the data storage system.

3. The method of claim 2 wherein the method further comprises:
performing all the write commands referenced by the first CHT with respect to persistent storage of the data storage system; and
in response to performing all the write commands referenced by the first CHT:
follow the linked list to locate the second data structure;
replacing the first data structure with the second data structure as an entry in the third CHT; and
deleting the first CHT and the first data structure.

4. The method of claim 3 wherein:
each entry of the first CHT references a set of one or more of the stored write commands, each set including write commands directed at addresses of the logical disk that are within no more than 1024 logical block addresses of each other; and
performing all the write commands referenced by the first CHT with respect to persistent storage of the data storage system includes performing all the write commands stored within a first entry of the first CHT followed by performing all the write commands stored within a second entry of the first CHT.

5. The method of claim 2 wherein:
the first, second, and third CHTs are all stored within memory of the computing device;
the memory includes a pool having a predetermined number of bucket blocks, each bucket block storing a fixed number of hash buckets, each bucket block having a size equal to a size of a filesystem storage block of the data storage system; and
hash buckets are assigned from the pool to CHTs in groups by the bucket block.

6. The method of claim 5 wherein:
the first CHT includes an initial number of bucket blocks for storing hash buckets of the first CHT;
the determination is performed based on adding a new entry to the first CHT;
the determination includes determining that the load factor of the first CHT has exceeded a predetermined maximum threshold value; and
creating the second CHT includes assigning an increased number of bucket blocks to the second CHT for storing hash buckets of the second CHT, the increased number being larger than the initial number.

7. The method of claim 6 wherein assigning the increased number of bucket blocks to the second CHT includes assigning double the initial number of bucket blocks to the second CHT.

8. The method of claim 6 wherein the method further comprises:
determining that a remaining number of bucket blocks within the pool that are not assigned to any CHT has fallen below a predetermined threshold number;
in response to determining that the remaining number has fallen below the predetermined threshold number, determining that the first CHT has a lowest load factor of any CHT pointed to by a data structure of the third CHT; and
in response to determining that the first CHT has the lowest load factor of any CHT pointed to by a data structure of the third CHT, prioritizing the first CHT for performance of write commands stored within the first CHT with respect to persistent storage of the data storage system.

9. The method of claim 5 wherein:
the first CHT includes an initial number of bucket blocks for storing hash buckets of the first CHT;
the determination includes determining that the load factor of the first CHT has remained below a predetermined minimum threshold value for a predetermined amount of time; and
creating the second CHT includes assigning a decreased number of bucket blocks to the second CHT for storing hash buckets of the second CHT, the decreased number being smaller than the initial number.

10. The method of claim 9 wherein the method further comprises, in response to determining that the load factor of the first CHT has remained below the predetermined minimum threshold value for the predetermined amount of time, prioritizing the first CHT for performance of write commands stored within the first CHT with respect to persistent storage of the data storage system.

11. The method of claim 1 wherein the predetermined threshold value is within a range of 1 to 16.

12. An apparatus comprising processing circuitry coupled to memory configured to:
store references to write commands directed at a logical disk within entries of a first chained hash table (CHT) that is associated with the logical disk, the first CHT being pointed to by a first data structure representative of the logical disk;
keep track of a load factor of the first CHT during operation of a data storage system; and
in response to determining that the load factor of the first CHT has transitioned outside of predetermined bounds:
create a second CHT that is associated with the logical disk and a second data structure representative of the logical disk, the second CHT being pointed to by the second data structure;
link the second data structure to the first data structure via a linked list; and
store references to new write commands directed at the logical disk within entries of the second CHT rather than the first CHT without moving references to write commands already referenced in the first CHT to the second CHT.

13. The apparatus of claim 12 wherein the first data structure is an entry of a third CHT that represents a set of logical disks managed by the data storage system.

14. The apparatus of claim 13 wherein the processing circuitry coupled to memory is further configured to, in response to performing all the write commands referenced by the first CHT with respect to persistent storage of the data storage system:
follow the linked list to locate the second data structure;
replacing the first data structure with the second data structure as an entry in the third CHT; and
deleting the first CHT and the first data structure.

15. The apparatus of claim 14 wherein:
each entry of the first CHT references a set of one or more of the stored write commands, each set including write commands directed at addresses of the logical disk that are within no more than 1024 logical block addresses of each other; and
performing all the write commands referenced by the first CHT with respect to persistent storage of the data storage system includes performing all the write commands stored within a first entry of the first CHT followed by performing all the write commands stored within a second entry of the first CHT.

16. The apparatus of claim 13 wherein:

the first, second, and third CHTs are all stored within memory of the computing device;

the memory includes a pool having a predetermined number of bucket blocks, each bucket block storing a fixed number of hash buckets, each bucket block having a size equal to a size of a filesystem storage block of the data storage system; and hash buckets are assigned from the pool to CHTs in groups by the bucket block.

17. The apparatus of claim 16 wherein:

the first CHT includes an initial number of bucket blocks for storing hash buckets of the first CHT;

the determining is performed in response to adding a new entry to the first CHT;

the determining includes determining that the load factor of the first CHT has exceeded a predetermined maximum threshold value; and creating the second CHT includes assigning an increased number of bucket blocks to the second CHT for storing hash buckets of the second CHT, the increased number being larger than the initial number.

18. The apparatus of claim 17 wherein assigning the increased number of bucket blocks to the second CHT includes assigning double the initial number of bucket blocks to the second CHT.

19. The apparatus of claim 16 wherein:

the first CHT includes an initial number of bucket blocks for storing hash buckets of the first CHT;

the determining includes determining that the load factor of the first CHT has remained below a predetermined minimum threshold value for a predetermined amount of time; and creating the second CHT includes assigning a decreased number of bucket blocks to the second CHT for storing hash buckets of the second CHT, the decreased number being smaller than the initial number.

20. A computer program product comprising a non-transitory storage medium storing instructions, which, when performed by computing circuitry of a data storage apparatus, cause the data storage apparatus to:

store references to write commands directed at a logical disk within entries of a first chained hash table (CHT) that is associated with the logical disk, the first CHT being pointed to by a first data structure representative of the logical disk;

keep track of a load factor of the first CHT during operation of the data storage apparatus; and in response to determining that the load factor of the first CHT has transitioned outside of predetermined bounds:

create a second CHT that is associated with the logical disk and a second data structure representative of the logical disk, the second CHT being pointed to by the second data structure;

link the second data structure to the first data structure via a linked list; and store references to new write commands directed at the logical disk within entries of the second CHT rather than the first CHT without moving references to write commands already referenced in the first CHT to the second CHT.

* * * * *